United States Patent
McNew

(10) Patent No.: US 10,272,783 B2
(45) Date of Patent: Apr. 30, 2019

(54) DRIVER AND VEHICLE RESPONSIBILITY MATRIX

(71) Applicant: TOYOTA MOTOR ENGINEERING & MANUFACTURING NORTH AMERICA, INC., Erlanger, KY (US)

(72) Inventor: John-Michael McNew, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/211,799

(22) Filed: Jul. 15, 2016

(65) Prior Publication Data

US 2018/0015828 A1    Jan. 18, 2018

(51) Int. Cl.
| | |
|---|---|
| *B60Q 9/00* | (2006.01) |
| *G05D 1/02* | (2006.01) |
| *G06F 3/14* | (2006.01) |
| *B60K 35/00* | (2006.01) |

(52) U.S. Cl.
CPC ............... *B60K 35/00* (2013.01); *B60Q 9/00* (2013.01); *G05D 1/021* (2013.01); *G06F 3/14* (2013.01); *B60K 2350/106* (2013.01); *B60K 2350/1076* (2013.01); *B60K 2350/901* (2013.01)

(58) Field of Classification Search
None
See application file for complete search history.

(56) References Cited

U.S. PATENT DOCUMENTS

| 6,226,570 B1 | 5/2001 | Hahn |
| 7,499,804 B2 | 3/2009 | Svendsen et al. |
| 8,606,455 B2 | 12/2013 | Boehringer et al. |
| 9,150,224 B2 | 10/2015 | Yopp |
| 9,235,211 B2 | 1/2016 | Davidson et al. |
| 9,242,647 B2 | 1/2016 | Tsimhoni et al. |

(Continued)

FOREIGN PATENT DOCUMENTS

| JP | 2015-141052 | 8/2015 |
| JP | 2015-141054 | 8/2015 |

(Continued)

OTHER PUBLICATIONS

Daniel Kennel, SuP Automated driving EN, 2015, Schlegel und Partner.*

(Continued)

*Primary Examiner* — YuJang Tswei
(74) *Attorney, Agent, or Firm* — Oblon, McClelland, Maier & Neustadt, L.L.P.

(57) ABSTRACT

Aspects of the disclosure provide an automated driving system and a method for providing an indication of a driver's responsibilities in a vehicle having an automated driving system. The system includes a display device for displaying information to a driver of the vehicle, and a controller configured to display, at the display device, a driver and vehicle responsibility matrix (DVR matrix). The DVR matrix includes a first set of indicators each indicating a driving responsibility of the driver, a second set of indicators each indicating a driving responsibility of the automated driving system. In one example, the controller is configured to display the DVR matrix corresponding to an automation state.

20 Claims, 9 Drawing Sheets

(56) References Cited

U.S. PATENT DOCUMENTS

| | | | |
|---|---|---|---|
| 2006/0235615 A1 | 10/2006 | Kato et al. | |
| 2014/0088814 A1 | 3/2014 | You et al. | |
| 2014/0156133 A1* | 6/2014 | Cullinane | B60W 30/00 701/23 |
| 2014/0336935 A1* | 11/2014 | Zhu | G01W 1/14 702/3 |
| 2015/0175070 A1 | 6/2015 | Attard et al. | |
| 2015/0212705 A1* | 7/2015 | Sasaki | G06F 3/04817 715/777 |
| 2015/0253772 A1* | 9/2015 | Solyom | G05D 1/0212 701/25 |
| 2015/0253778 A1 | 9/2015 | Rothoff et al. | |
| 2016/0031441 A1* | 2/2016 | Foley | B60W 30/00 701/23 |
| 2016/0298976 A1 | 10/2016 | Sato et al. | |

FOREIGN PATENT DOCUMENTS

| | | |
|---|---|---|
| JP | 2015-141478 | 8/2015 |
| JP | 2015-158467 | 9/2015 |
| JP | 2015-158469 | 9/2015 |
| JP | 2015-182624 | 10/2015 |
| WO | WO 2015/129366 A1 | 9/2015 |
| WO | WO 2015-162784 A1 | 10/2015 |

OTHER PUBLICATIONS

SAE International, Driver still has a seat in Delphi's automated-driving vision, Sep. 13, 2015, Automotive Engineering Magazine.*
Huwieler, "Automated Vehicles, Part I: A Society Without Control", Jul. 1, 2016, The Automated Driving Community.*

* cited by examiner

| COLUMN OF DVR MATRIX | GRAPHICS | RESPONSIBILITIES INDICATED BY THE GRAPHICS | |
|---|---|---|---|
| COLUMN 1 | 310 | LONGITUDINAL CONTROL | 301 |
| COLUMN 2 | 320 | LATERAL CONTROL | 302 |
| COLUMN 3 | 331   332 | HANDS-ON-WHEEL / HANDS-FREE OK | 303 |
| COLUMN 4 | 341   342 | EYES-ON-ROAD / EYES-OFF-ROAD OK | 304 |
| COLUMN 5 | 351   352 | NO SLEEPING/ SLEEPING OK | 305 |

300A

= DRIVER        = VEHICLE

DRIVER AND VEHICLE RESPONSIBILITY MATRIX

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An automated driving system in an automated vehicle is capable of performing some driving functions, such as steering control, braking control, and navigation, without an intervention from a driver. During operation of such an automated vehicle, the driver and the vehicle may assume different responsibilities for driving the vehicle depending on road conditions. When road conditions change, responsibilities for driving the vehicle may be transferred from the driver to the vehicle or vice versa. Thus, there is a need for explicitly indicating driver's responsibilities to a driver in order to safely and comfortably drive an automated vehicle.

Traditionally, automated driving systems merely indicate a level of automated driving, e.g., "Level 3". This approach does not indicate to a driver what responsibilities the driver does and does not have for each of the automated driving levels of an automated vehicle in an easy-to-understand centralized fashion.

Furthermore, in traditional HMI, system status, mode change requests, and warnings are often represented as unrelated (visually, spatially, and conceptually) icons that make it more difficult for the driver to process quickly and understand the vehicles expectations of the driver.

The U.S. Pat. No. 8,825,261 B1 patent provided a method for conveying status information to a passenger in an automated vehicle. In one example, a control computer can illuminate elements of the vehicle. The color and location of the illumination may indicate the status of the control computer, for example, whether the control computer has been armed, is ready to take control of the vehicle, or is currently controlling the vehicle.

SUMMARY

Aspects of the disclosure provide an automated driving system for providing an indication of a driver's responsibilities in a vehicle having an automated driving system. The system includes a display device for displaying information to a driver of the vehicle, and a controller configured to display, at the display device, a driver and vehicle responsibility matrix (DVR matrix). The DVR matrix includes a first set of indicators each indicating a driving responsibility of the driver, a second set of indicators each indicating a driving responsibility of the automated driving system. In one example, the controller is configured to display the DVR matrix corresponding to an automation state.

In one example, the DVR matrix is displayed as a graphic, and the indicators in a first row or a second row are displayed as icons and/or texts. The term matrix is used because in the primary embodiment of this system, the rows of the matrix correspond to who should be responsible (Automated Vehicle or Driver) and the columns indicate what they are responsible for. The indicators in each column of the matrix correspond to the same driving responsibility.

In an example, the controller is further configured to display a notification indicating a request of the automated driving system for driving responsibility transition between the driver and the automated driving system. The notification is represented with an indicator between two indicators in a same column of the DVR matrix. In another example, the controller is further configured to display an indicator of the first row or the second row with a color to indicate a warning condition.

In various examples, the display device is one of a head up display, an instrument cluster, a liquid crystal display, and a mobile device. In addition, the responsibility of the driver includes performing one of longitudinal control, lateral control, hand-on-wheel, eyes-on-road, and no-sleeping.

Aspects of the disclosure provide a method for providing an indication of a driver's responsibilities in a vehicle having an automated driving system. The method includes receiving information indicating a road condition, determining, based on the road condition, an automation state of the automated driving system, and displaying a DVR matrix corresponding to the automation state.

Aspects of the disclosure provide a non-transitory computer-readable storage medium on which computer readable instructions of a program are stored. The instructions, when executed by one or more processors, causing the one or more processors to perform a method. The method provides an indication of a driver's responsibilities in a vehicle having an automated driving system.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide a method and system for providing an explicit indication of a driver's responsibilities for driving an automated vehicle, a method for requesting from the driver a transition of responsibilities, and a method for warning the driver when they are not fulfilling a particular driving responsibility or when the automated system capability of fulfilling a driving responsibility is degraded. Because all of the above are represented in one graphical location with the same "visual language" the driver's comprehension of what is required of them will be better and faster. Specifically, a DVR matrix is displayed at a display device in the automated vehicle. The DVR matrix describes driving responsibilities of a driver and driving responsibilities of the automated vehicle corresponding to an automated driving level (also referred to as an automation level). In addition, the DVR matrix indicates requests of an automated driving system for transferring driving responsibilities between the driver and the automated driving system. In this way, with a quick glance at the DVR matrix, a driver can ascertain necessary actions the driver is required to perform, and awareness of the current automated driving level. The transitions between different automated driving levels can also be conducted smoothly.

Figure 1:
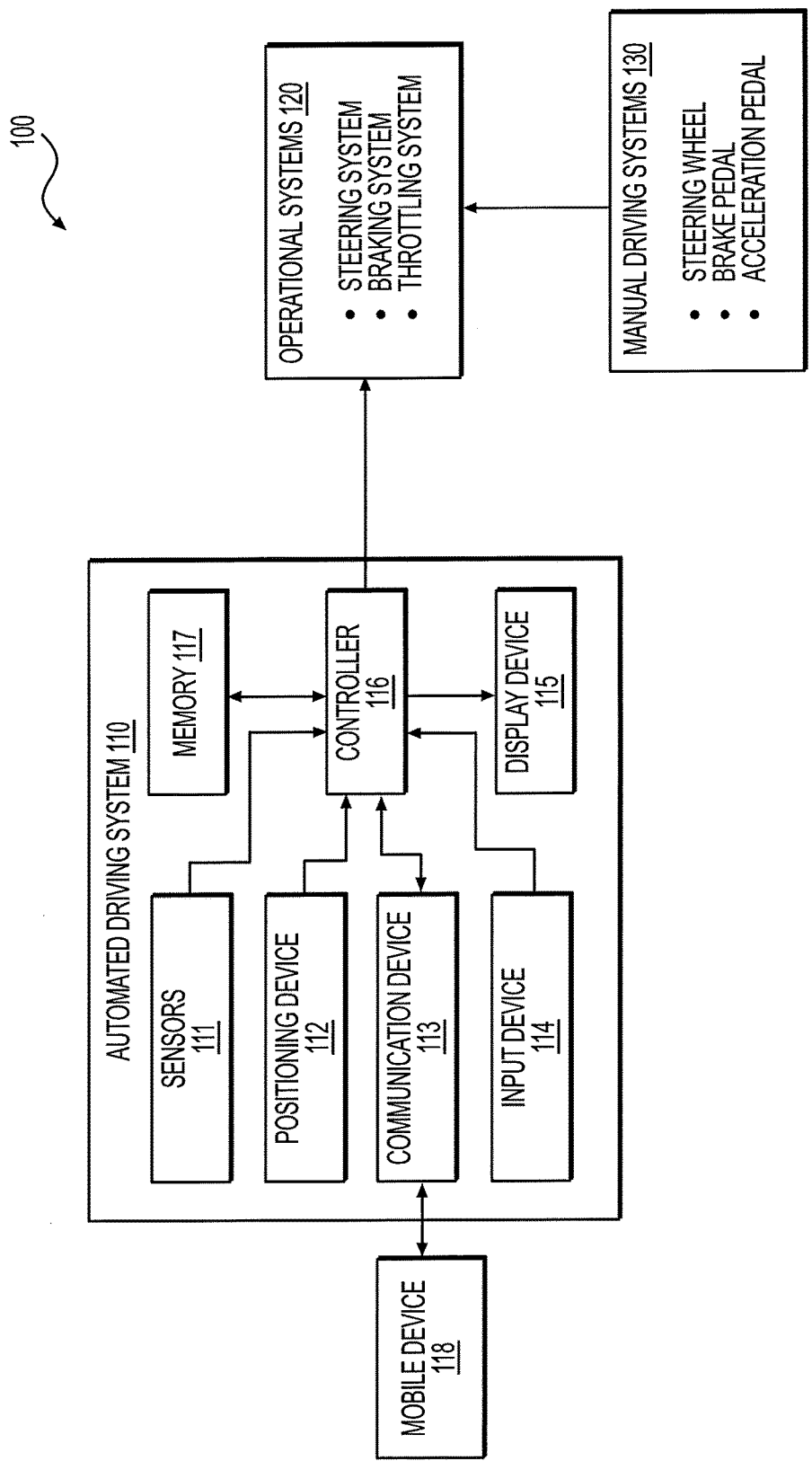
FIG. 1 shows an automated vehicle according to an example of the disclosure.

FIG. 1 shows an automated vehicle 100 according to an example of the disclosure. The automated vehicle 100 is capable of performing various driving functions, such as steering control, braking control, and the like, automatically without a human intervention. The automated vehicle 100 can be any type of vehicle, such as cars, trucks, motorcycles, buses, boats, airplanes, trams, golf carts, trains, trolleys, and the like. In one example, the automated vehicle 100 includes an automated driving system (ADS) 110, operational systems 120, and manual control devices 130. These elements are coupled together as shown in FIG. 1.

The ADS 110 is configured to automatically perform various driving functions according to road conditions. Road conditions refers to state of a road having impact on driving a vehicle, such as type of the road, traffic conditions, weather conditions, obstacles detected on the road, and the like. In one example, the ADS 100 includes sensors 111, a positioning device 112, a communication device 113, an input device 114, a display device 115, a controller 116, and a memory 117. These elements are coupled together as shown in FIG. 1.

The sensors 111 are configured to generate sensor signals indicating road conditions, driver state, operations performed by a driver, and the like. In an example, the sensors 111 include laser scanners, radars, cameras, sonars, and the like to monitor environment of the automated vehicle 100. In another example, the sensors 111 include a camera for inspecting state of a driver. In a further example, the sensors 111 include sensors, such as a press force sensor, for detecting actions of a driver operating the manual control devices 130, such as a steering wheel. The positioning device 112 is configured to provide data indication a location of the automated vehicle 100. In an example, the positioning device 112 includes a satellite positioning signal receiver, such as a Global Positioning System (GPS) receiver.

The communication device 113 is configured to provide a communication interface to various communication networks and devices. In an example, the communication device 113 includes functions for communicating with a cellular network, such that digital maps can be downloaded to the ADS 110. In other examples, the communication device 113 is capable of operating with various wireless or wired technologies, such as Bluetooth, Wi-Fi, Ethernet, and the like. The input device 114 is configured to receive inputs from a driver. In one example, the input device 114 includes a touch panel incorporated with a liquid crystal display (LCD). A driver uses the touch panel to input a destination of a trip, and select a route for the trip.

The display device 115 is configured to output information from the ADS 110 to a driver. Specifically, the display device 115 is used by the ADS 110 to display a DVR matrix indicating driving responsibilities of a driver and the ADS 110. In one example, the display device 115 is a head up display (HUD), for example, arranged on the windshield of the automated vehicle 100. A HUD refers to any transparent display that presents data without requiring users to look away from their usual viewpoints. In another example, the display device 115 is an instrument cluster. An instrument cluster refers to a display device, such as an LCD, for displaying output information of various instrumentations, e.g., a speedometer, in a vehicle. In a further example, the display device 115 is an LCD that, for example, can be used for displaying navigation information.

In an example, a mobile device 118 is used for performing functions of the display device 115, and output information from the ADS 110 to a driver is displayed to the mobile device. The mobile device 118 can be a mobile phone, a tablet computer, a laptop computer, and the like. In the example, the ADS 110 communicates with the mobile device 118 through the communication device 113 using wireless technologies such as Bluetooth, Wi-Fi, and the like. Output information from the ADS 110 to a driver, such as a DVR matrix, is transmitted to the mobile device 118, and displayed at the mobile device 118.

The memory 117 is configured to store instructions of various programs. The instructions, when executed by the controller 116 in an example, cause the controller 116 to perform various functions for driving the automated vehicle 100 automatically. In addition, the memory stores data of digital maps that includes road condition information (e.g., road type), and can also be used for navigation functions. The memory 117 may be of any type capable of storing instructions and data, such as hard drive, ROM, RAM, flash memory, DVD, and the like.

The controller 116 is configured to determine an automation state of the ADS 110, and display a DVR matrix corresponding to the automation state. An automation state describes an automation condition of the ADS 110 which corresponds to an arrangement of driving functions between a driver and the ADS 110. An automation state can be determined based on factors including current road conditions and capabilities of the ADS 110, and can change when road conditions change. For example, in an automation state, driving functions of steering, braking, and throttling control are performed by the ADS 110, while driving function of "eyes-on-road" (refers to a driver monitoring conditions of the road) is performed by a driver. For another example, in another automation state, such as a fully autonomous state, ADS 110 takes overall control of the vehicle. The ADS 110 performs functions of steering control, braking control, and throttling control as well as monitoring road conditions and responding to any changes of road conditions. The driver is not required to perform any driving functions.

The ADS 110 can have multiple automation states, such as hands on wheel, eyes on road, eyes on warnable display, eyes off-road, seat recline, seat turn around, sleeping. Generally, a warnable display is capable of providing a warning signal to a user, for example, by displaying warning or alert information on a display screen of a mobile device, or a display screen of a dashboard of the vehicle. As a result, for example, when a user is watching a video or playing a game on a warnable display, the warning signal can alert the user. In an example, the multiple automation states are categorized into multiple automation levels. Each multiple automation level corresponds to one or more automation states.

In one example, the multiple automation states are separated into five automation levels from Level 0 to Level 4, and each automation level corresponds to different assignments of driving functions between a driver and the ADS. The automation levels of this example are described below.

Level 0, no-automation: The driver is in sole control of the automated vehicle 100, and performs functions such as braking, steering, and throttle control at all times.

Level 1, function-specific control: One of the two driving control functions (longitudinal control or lateral control) is performed by the ADS 110, but longitudinal and lateral control are not both performed by the ADS 110. For example, the driver cannot be disengaged from operating the automated vehicle 100 by allowing the vehicle to steer (regardless of the hand position) AND allowing the vehicle to control speed. The driver performs the other driving control function and the monitoring functions (hands-on-wheel, seat forward, eyes-on-road, eyes-on-warnable display, not sleeping, etc.) except the one function performed by the ADS 110.

Level 2, combined control function automation: Both of the driving control functions, such as longitudinal control (throttling control and braking control) and lateral control (steering control), are performed by the ADS 110 at the same time. However, the driver is responsible for monitoring the roadway (eyes-on-road), and under some road conditions, the driver is required to put his hands on the steering wheel (this function is referred to as "hands-on-wheel"). In addition, the driver is expected to be available for taking control from the ADS 110 at all times and on short notice.

Level 3, limited self-driving automation. The ADS 110 performs all driving control functions including monitoring the road condition (eyes-on-road). The driver is not expected to constantly monitor the roadway while driving, but is expected to be available for occasional control. For example, the driver can perform actions unrelated with driving (eyes-off-road), such as checking a mobile phone, but the driver cannot fall asleep. This part of function is referred to as "no-sleeping". Depending on the particular implementation of level three, the driver may be allowed to take their eyes of the road, but must keep their attention on a dedicated secondary display onto which mode transition requests can be sent to limit the amount of time required to re-engage the driver. To implement such a constriction within the DVR matrix, the eyes-on-road graphic may be replaced with an eyes-on-display graphic in the driver row and eye position column. When the ADS 110 detected a change of road condition, such as a construction area being detected, the ADS 110 may provide a notice to request the driver to take over control of the automated vehicle 100.

Level 4, full self-driving automation: the ADS 110 performs all driving functions and monitor road conditions for an entire trip, and the driver is not expected to be available for control at any time during the trip.

Accordingly, a driver and the ADS 110 have different driving responsibilities for performing certain functions corresponding to an automation state or level. In other words, each of the different automation states or levels corresponds to a set of driver's driving responsibilities and a set of responsibilities of the ADS 110. Accordingly, the controller 116 displays a DVR matrix to indicate driving responsibilities of a driver and the ADS 110 corresponding to the automation state or level. In an example, the DVR matrix includes a first row of indicators each indicating a driving responsibility of the driver, and a second row of indicators each indicating a driving responsibility of the ADS 110. In addition, the DVR matrix further includes columns, and each column includes indicators in the first row or the second row. The indicators in the same column but different row correspond to a same driving responsibility for performing a driving function.

In addition to displaying the DVR matrix, the controller 116 is configured to generate control signals to control the operational systems 120 to perform various driving functions. For example, the controller 116 generates control signals to actuate different actuators included in the operational systems 120 to perform steering, braking and throttling control.

The controller 116 can be implemented with any suitable software and hardware in various embodiments. In one example, the controller 116 is implemented using integrated circuits (IC), such as application specific integrated circuits (ASIC), field programmable gate arrays (FPGA), and the like. In another example, the controller 116 is implemented using a processor executing instructions of programs stored in the memory 117.

The manual driving devices 130 is configured to control the operational systems 120 when operated by a driver. In an example, the manual driving devices 130 include a steering wheel, a brake pedal, an acceleration pedal, and the like. These manual driving devices 130 each include mechanical, electrical, or hydraulic connections to corresponding components of the operational systems 120. When a driver manipulates the manual driving devices 130, the corresponding components of the operational systems 120 can be operated to perform corresponding driving functions. In this way, the automated vehicle 100 can be controller manually.

The operational systems 120 include a steering system, a braking system, a throttling system, and the like. Each system in the operational systems can include relays, motors, solenoids, pumps, and the like, and performs driving functions in response to control signals received from the controller 116. Thus, automated driving functions can be realized. In addition, each of the operation systems can be controlled by the manual driving devices 130, such that a driver can manually control the automated vehicle when required.

Figure 2:
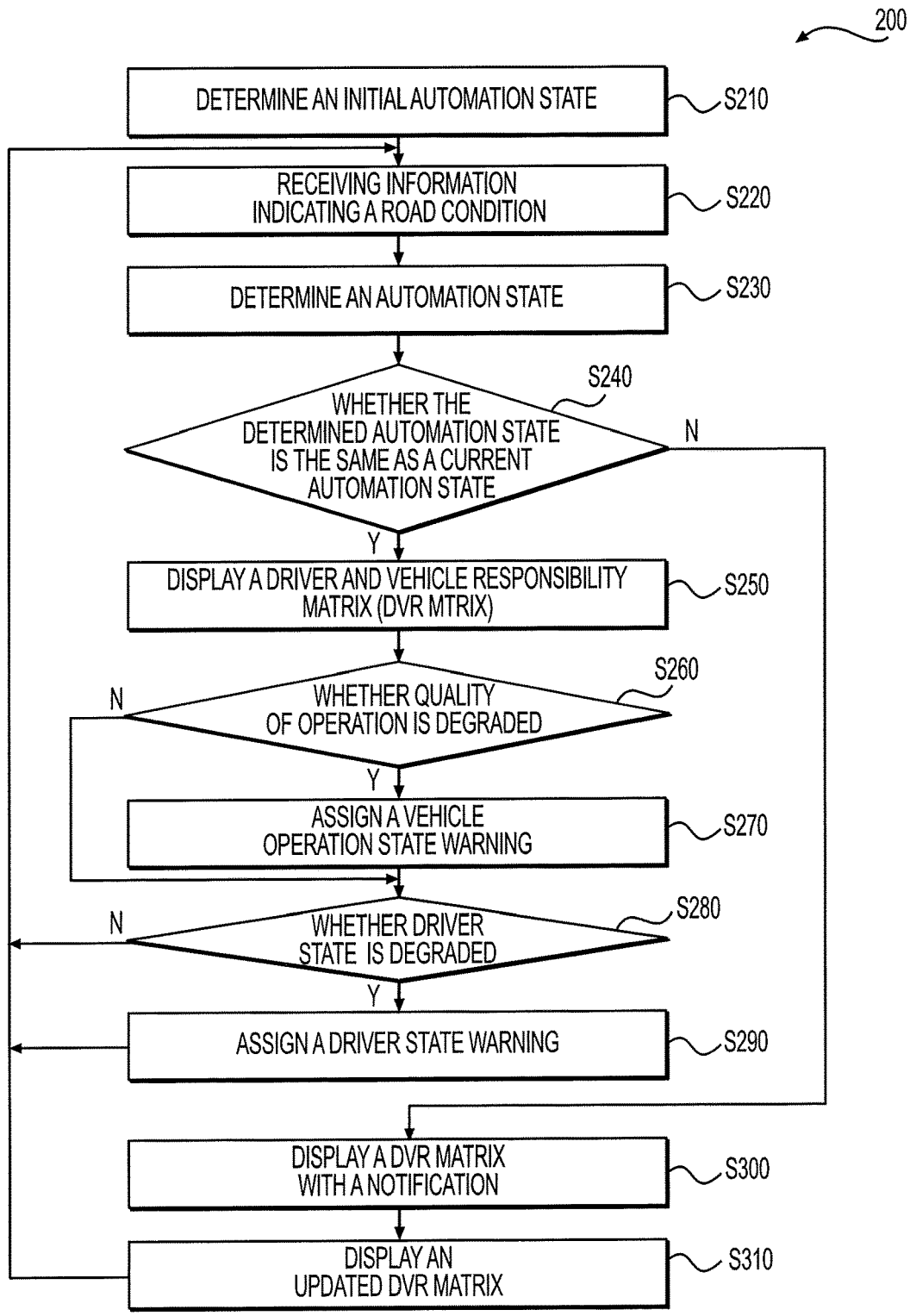
FIG. 2 shows a process for providing an indication of a driver's responsibilities in an automated vehicle according to an example of the disclosure.

FIG. 2 shows a process 200 for providing an indication of a driver's responsibilities in an automated vehicle according to an example of the disclosure. The automated vehicle 100 is used as an example for explanation of the process 200. The process starts at S210.

At S210, an initial automation state is determined at the beginning of a trip. For example, the controller 116 can receive information indicating a road condition from multiple sources, and determine a suitable automation state where a driver and the ADS are assigned with suitable driving functions. In an example, at the beginning of a trip, the controller 116 recognizes a road type of a first stretch of the trip based on a digital map stored in the memory 117; the controller 116 realizes a traffic situation based on information received through the communication device 113; the controller 116 knows a weather condition (e.g. snowing, raining, etc.) based on sensor signal from the sensors 111. Based on information from the multiple sources, the controller 116 may determine an automation state for the beginning of the trip (the automation state is referred to as a current state of the beginning of the trip). For example, a Level 2 automation level may be determined in a state where the road condition is degraded. Accordingly, the ADS 110 performs lateral control (steering control) and longitudinal control (braking control and throttling control), while the driver is required to monitor the road (eyes-on-road function). Accordingly, an initial DVR matrix corresponding to the Level 2 automation level is displayed at the display device 115.

At S220, information indicating a road condition from multiple sources is continually received at the controller 116 while on the trip. Similar to S210, in an example, information of a road type from the digital map in memory 117, traffic situation information received from communication device 113, weather information from sensors 111 are continually received during the trip.

At S230, an automation state is determined based the information indicating a road condition received at S220. For example, when no changes of the road condition are found, the controller 116 may determine to keep the current automation state, or in other words, the controller 116 determines an automation state the same as the current automation state. When changes of the road condition arise, the controller 116 may determine an automation state that is different from the current automation state. For example, a construction area ahead of the trip is detected by the sensors 111, the controller 116 determines a Level 0 automation state for the trip passing the construction area.

At S240, whether the determined automation state is the same as the current automation state is determined by the controller 116. When the automation state determined at S230 is the same as the current state, the process 200 proceeds to S250; otherwise, the process 200 proceeds to S260.

At S250, a DVR matrix whose assignment is the same as the current DVR matrix is displayed corresponding to the current automation state of the automation vehicle 100. The displayed DVR matrix now is the current DVR matrix.

At S260, the controller 116 uses information from sensors 111 to determine if quality of operation or monitoring is degraded for any of the dimensions for which the vehicle has responsibility. For instance, a current lane tracking device may have a reduced range of vision at a curve and hence is operating in a reduced capacity. When the quality of operation corresponding to the vehicle's responsibilities is degraded, the process 200 proceeds to S270. Otherwise, the process proceeds to S280.

At S270, the controller 116 assigns a vehicle operation state warning to the DVR matrix.

At S280, the controller 116 queries the driver monitoring sensors in the vehicle sensors 111 to determine if the driver state is degraded for the responsibilities that are assigned to the driver. If any of the assigned driver dimensions are found to be operating at a reduced capacity, such as the driver looking away from the road too often, or turning around his seat while the automation state is Level 2 requiring "seat forward" and "eyes-on-road" driver responsibilities, the process proceeds to S290. Otherwise, the process 200 proceeds to S220, and is iterated thereafter.

At S290, the controller 116 assigns a driver state warning to the DVR matrix. The process 200 proceeds to S220, and is iterated thereafter.

At S300, a DVR matrix with a transition notification is displayed. The DVR matrix includes a notification that indicates a request of the ADS 110 for responsibility transition between the driver and the ADS 100. For example, in the above examples, a Level 2 automation level was determined at S210, and a level 0 automation level was determined at S230 as a response to the detected construction area. As described earlier, in Level 2 automation level, the ADS 110 takes responsibilities of lateral control (steering control) and longitudinal control (braking and throttling control), while in Level 0 automation, a driver takes responsibilities of lateral control and longitudinal control. Accordingly, at S300 a notification representing a request for transferring the lateral control and longitudinal control to the driver is included in the DVR matrix and is displayed.

At S310, an updated DVR matrix is displayed after the driver confirms acceptance to the responsibility transition. For example, in the above example, the driver may recognize the notification for responsibility transition, and take actions to assume the driving responsibilities. For example, the driver may grip the steering wheel and press the brake pedal, and sensors 111 arranged on the steering wheel and the brake pedal can detect the press forces and inform changes to the controller 116. In this way, assuming the driving responsibilities can be affirmed. Consequently, an updated DVR matrix corresponding to the determined automation state can be displayed at the display device 115. The updated DVR matrix now is the current DVR matrix. Thereafter, the process 200 proceeds to S220, and is iterated from S220.

FIGS. 3A, 3B, 4-9 illustrate an example DVR matrix according to one embodiment of the disclosure. The example DVR matrix includes two rows: an upper row corresponds to a diver's driving responsibilities, referred to as a driver row, and a lower row corresponds to driving responsibilities of an ADS, such as the ADS 110 in FIG. 1 example, referred to as a vehicle row. In addition, the example DVR matrix includes five columns, and each column corresponds to a driving responsibility. The automated vehicle 100 is used as an example for explanation of the example DVR matrix.

Figures 3A, 3B:
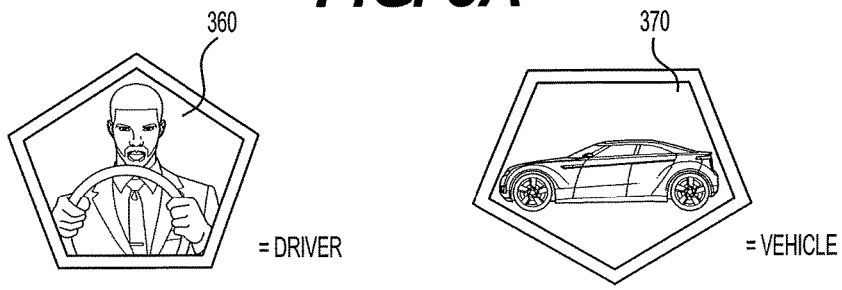
FIG. 3A shows a table including exemplary graphics for implementing an example DVR matrix.
FIG. 3B shows two graphics for indicating a row in an example DVR matrix being associated with a driver or an automated driving system.

FIG. 3A shows a table 300A including exemplary graphics for implementing the example DVR matrix. Each graphic in the table 300A is used as an indicator indicating a responsibility of a driver or the ADS 110. As shown, the table 300A includes five rows, and each row shows one or two graphics to be used in one of the five columns in the example DVR matrix. In the row 301 of the table 300A, the graphic 310 indicates the driving responsibility of performing longitudinal control, such as braking control, throttling control, and the like, and is displayed in the first column of the example DVR matrix. In the row 302 of the table 300A, the graphic 320 indicates the driving responsibility of performing lateral control, such as steering control, and the like, and is displayed in the second column of the example DVR matrix.

In the row 303 of the table 300A, the graphic 331 indicates the driving responsibility of putting hands on the steering wheel (hands-on-wheel), while the graphic 332 indicates that the driver may hand-off the steering wheel (hands-free OK). The graphics 331/332 are displayed in the third column of the example DVR matrix.

In the row 304, the graphic 341 indicates the driving responsibility of monitoring the road of a trip (eyes-on-road), while the graphic 342 indicates that the driver may move his attention from the road (eyes-off-road OK). The graphics 341/342 are displayed in the fourth column of the example DVR matrix.

In the row 305, the graphic 351 indicates the driving responsibility of being prepared to take over control from the ADS 110 while not engaging physically operation of the automated vehicle (no-sleeping), while the graphic 352 indicates that the driver may fall asleep (sleeping OK). The graphics 351/352 are displayed in the fifth column of the example DVR matrix.

It is to be appreciated that in various embodiments, the graphics for indicating driving responsibilities may take any suitable forms different from that shown in the table 300A.

In addition, numbers of graphics displayed in a column of a DVR matrix may be the same as or different from that shown in the table 300A. Further, DVR matrices in various embodiments may have any number of columns. For example, an additional indicator representing whether the driver can turn his chair around can be integrated into a DVR matrix. In another example, driver's eye monitoring requirement can be changed from "eyes on road" to "eyes on warnable display". Accordingly, the icon in the column 304 can include a "eyes on warnable display" icon in addition to "eyes on road" icon. In a further example, several seating position icons can be included in the DVR matrix. The seating position icons can include a "forward" icon, a "forward but reclined" icon, and "turn to any direction" icon indicating that any seating position is allowed as long as the driver does not sleep. Even further, part or all of the graphics can be substituted with texts in alternative embodiments.

FIG. 3B shows two graphics 360/370 for indicating a row in the example DVR matrix being associated with a driver or the ADS 110. The graphic 360 is displayed in the vicinity of the upper row (driver row) of the example DVR matrix, indicating the upper row is associated with responsibilities of a driver. In contrast, the graphic 370 is displayed in the vicinity of the lower row (vehicle row) of the example DVR matrix, indicating the lower row is associated with responsibilities of the ADS 110.

Figure 4:
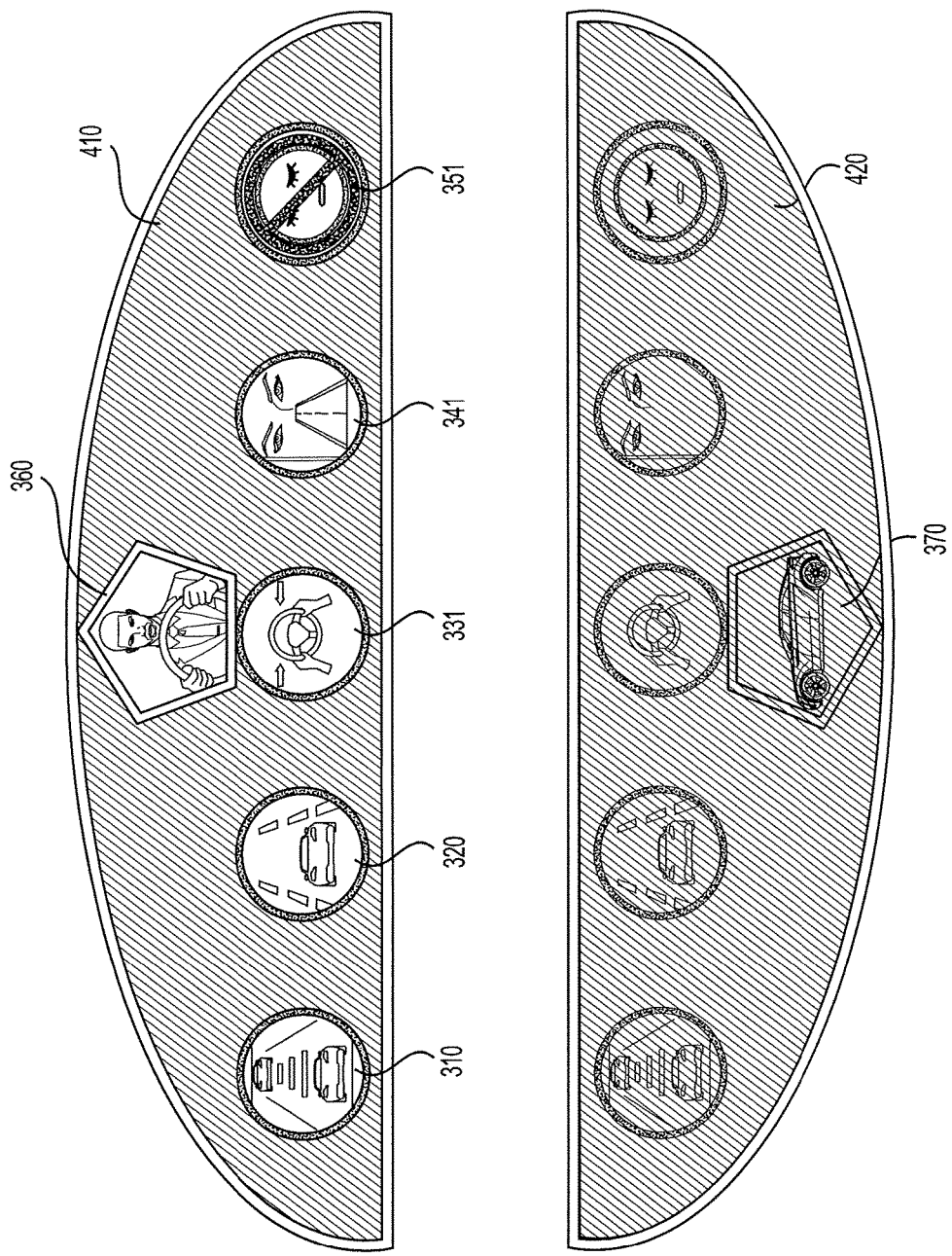
FIG. 4 shows an example DVR matrix corresponding to a Level 0 automation level.

FIG. 4 shows the example DVR matrix corresponding to the Level 0 automation level. The example DVR matrix includes two rows 410 and 420, and includes the graphics 360/370 in the rows 410 and 420 respectively. The upper row 410 corresponds to responsibilities of a driver, while the lower row 420 corresponds to responsibilities of the ADS 110. As described in the FIG. 1 example, in the Level 0 automation level, a driver is responsible for performing longitudinal control and lateral control, and monitoring the road all the time. Corresponding to the Level 0 automation level, five graphics 310, 320, 331, 341, and 351 are displayed in the driver row 410 indicating responsibilities of a driver. Specifically, the driver is responsible for longitudinal control and lateral control of the automated vehicle 100, and should put his hands on the steering wheel, and monitor the road. Moving his attention from driving (falling asleep) is not permitted. In contrast, no graphic is displayed in the vehicle row 420. As a result, a driver of the automated vehicle 100 can conveniently and quickly ascertain the driver's driving responsibilities corresponding to the current automation state.

In one embodiment of this invention, the concept for automation level, and the spatial layout of the responsibility columns reflects an ordering such that for the driver, if any driver state (i.e. all states except longitudinal and lateral control) responsibility is on in a column corresponding to the driver, all responsibilities for columns to the right are also on. Similarly if any driver states (i.e. all states except longitudinal and lateral control) responsibility is off in a column corresponding to the driver, all responsibilities for driver state responsibility columns to the left are also off. This structure means that the driver need only identify the left most driver state responsibility to know all the driver states they are responsible for maintaining and all those they are not responsible for maintaining. This speeds up the driver's understanding of the graphic. This is the embodiment shown in FIGS. 4-9. Other embodiments may not use this kind of spatial ordering.

Figure 5:
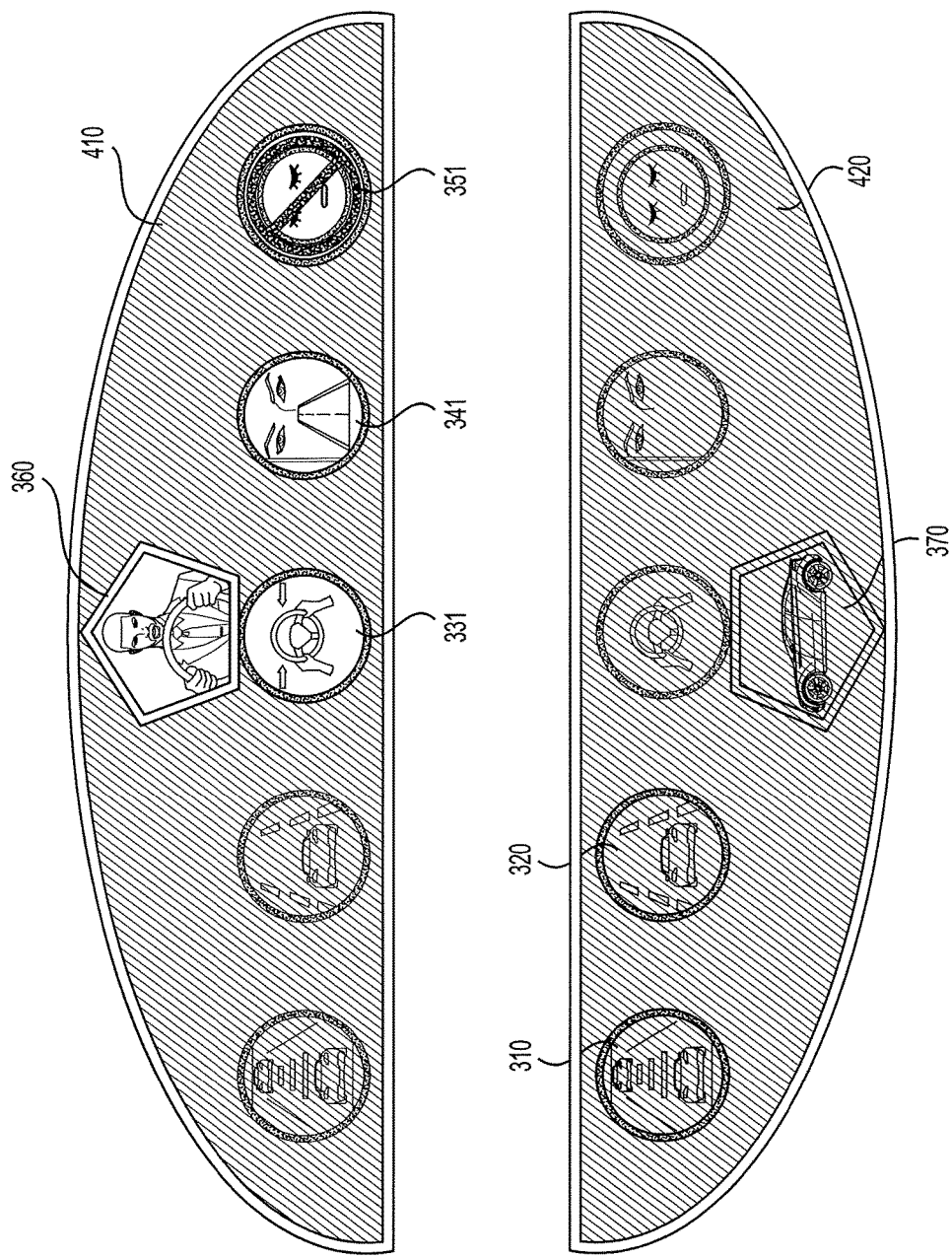
FIG. 5 shows an example DVR matrix corresponding to a Level 2 automation level.

FIG. 5 shows the example DVR matrix corresponding to the Level 2 automation level. Similar to FIG. 4, the example DVR matrix includes the driver row 410, and the vehicle row 420. As described in the FIG. 1 example, in the Level 2 automation level, ADS 110 takes responsibility of performing longitudinal control and lateral control, while the driver is responsible for monitoring the road all the time. In addition, the driver may be required to put his hands on the steering wheel in certain circumstances. Corresponding to the Level 2 automation level, three graphics 331, 341, and 351 are displayed in the driver row 410 indicating driving responsibilities of a driver. Specifically, the driving responsibilities of the driver include monitoring the road all the time and may include at times the requirement to have hands-on-the-wheel. Moving his attention from driving (falling asleep) is not permitted. In contrast, graphics 310 and 320 are displayed in the vehicle row 420 indicating the vehicle's responsibilities for longitudinal control and lateral control.

Figure 6:
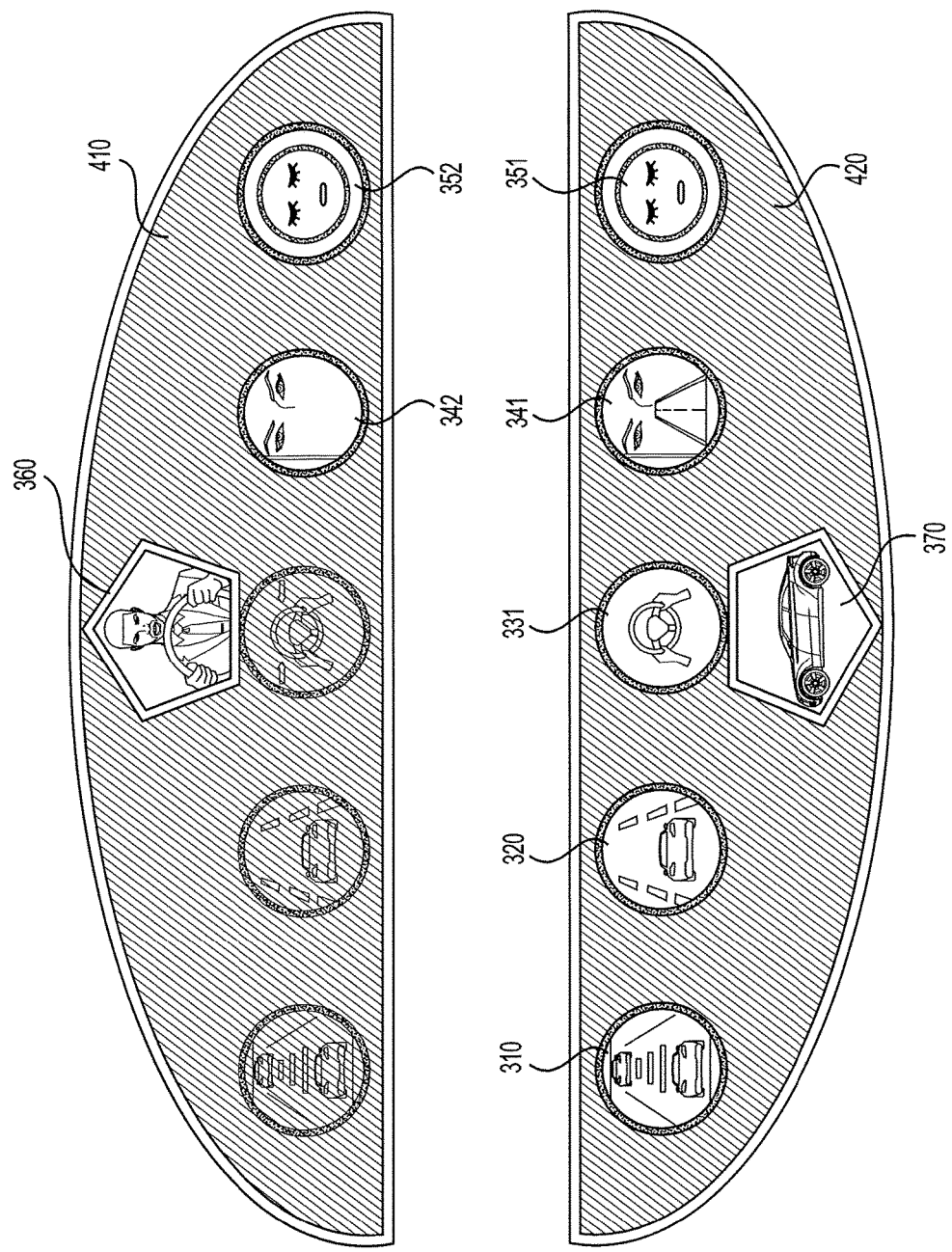
FIG. 6 shows an example DVR matrix corresponding to a Level 4 automation level.

FIG. 6 shows the example DVR matrix corresponding to the Level 4 automation level. Similar to FIG. 5, the example DVR matrix includes the driver row 410, and the vehicle row 420. As described in the FIG. 1 example, in the Level 4 automation level, the ADS 110 takes full responsibility of operating the automated vehicle 100 during the entire trip. A driver does not engage in any driving functions. Corresponding to the Level 4 automation level, five graphics 310, 320, 331, 341, and 351 are displayed in the vehicle row 420 indicating full driving responsibilities of the ADS 110. In addition, two graphics 342 and 352 are displayed in the driver row 410 indicating that the driver may disengage from the driving operations. In an alternative example, the graphics 342 and 352 displayed in the driver row 410 are not displayed. A driver can know from the driver row 410 that there are no driving responsibilities for the driver.

Figure 7:
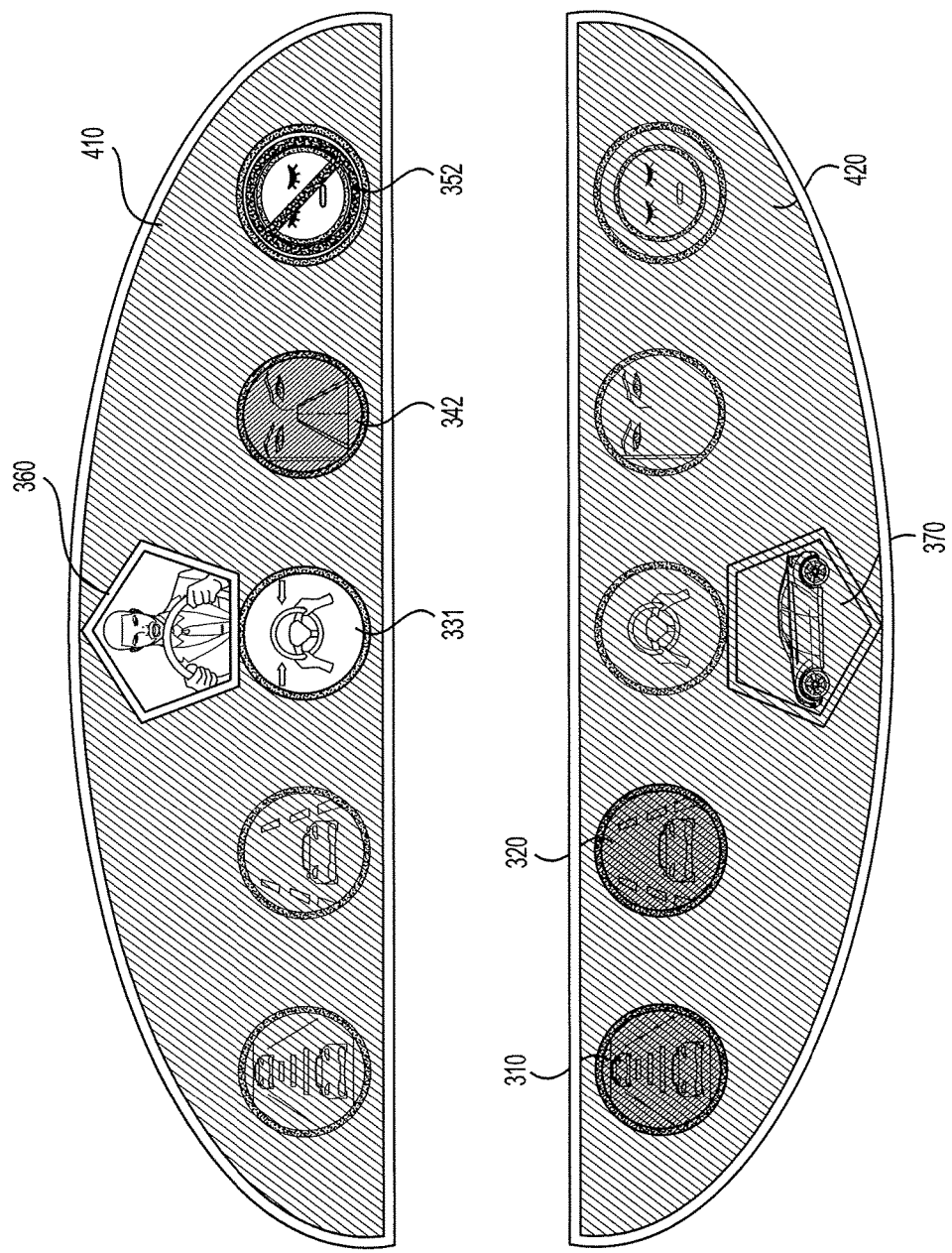
FIG. 7 shows an example DVR matrix corresponding to a Level 2 automation level with colors indicating warning conditions.

FIG. 7 shows the example DVR matrix corresponding to the Level 2 automation level with colors indicating warning conditions. When road conditions and longitudinal control and lateral sensing are good, graphics 310 and 320 may be shown in a green color indicating the good operation (not shown in FIG. 7). At the same time, the graphic 332 indicating hands-free is OK can be displayed (not shown). Or, no graphics are displayed at the middle location of the driver row 410, which indicates a driver does not have responsibilities to operate the steering wheel (not shown). When the road conditions become worse, for example, traffic becomes heavier, graphics 310 and 320 may be shown in a yellow color indicating the worse control performance is expected (but not so bad as to require the driver to take over) as shown in FIG. 7. This corresponds to assigning a vehicle operation state warning described in the step S270 in the process 200 in FIG. 2. At the same time, the graphic 331 indicating hands-on-wheel is required can be displayed.

In addition, in one example, when a camera senses a driver moves away his eyes from monitoring the road when the automated vehicle is operating at Level 2 automation level, the graphic 341 in the driver row 410 may flash with a red color providing a warning signal to the driver. This corresponds to assigning a driver state warning described in the step S290 in the process 200 in FIG. 2.

Figure 8:
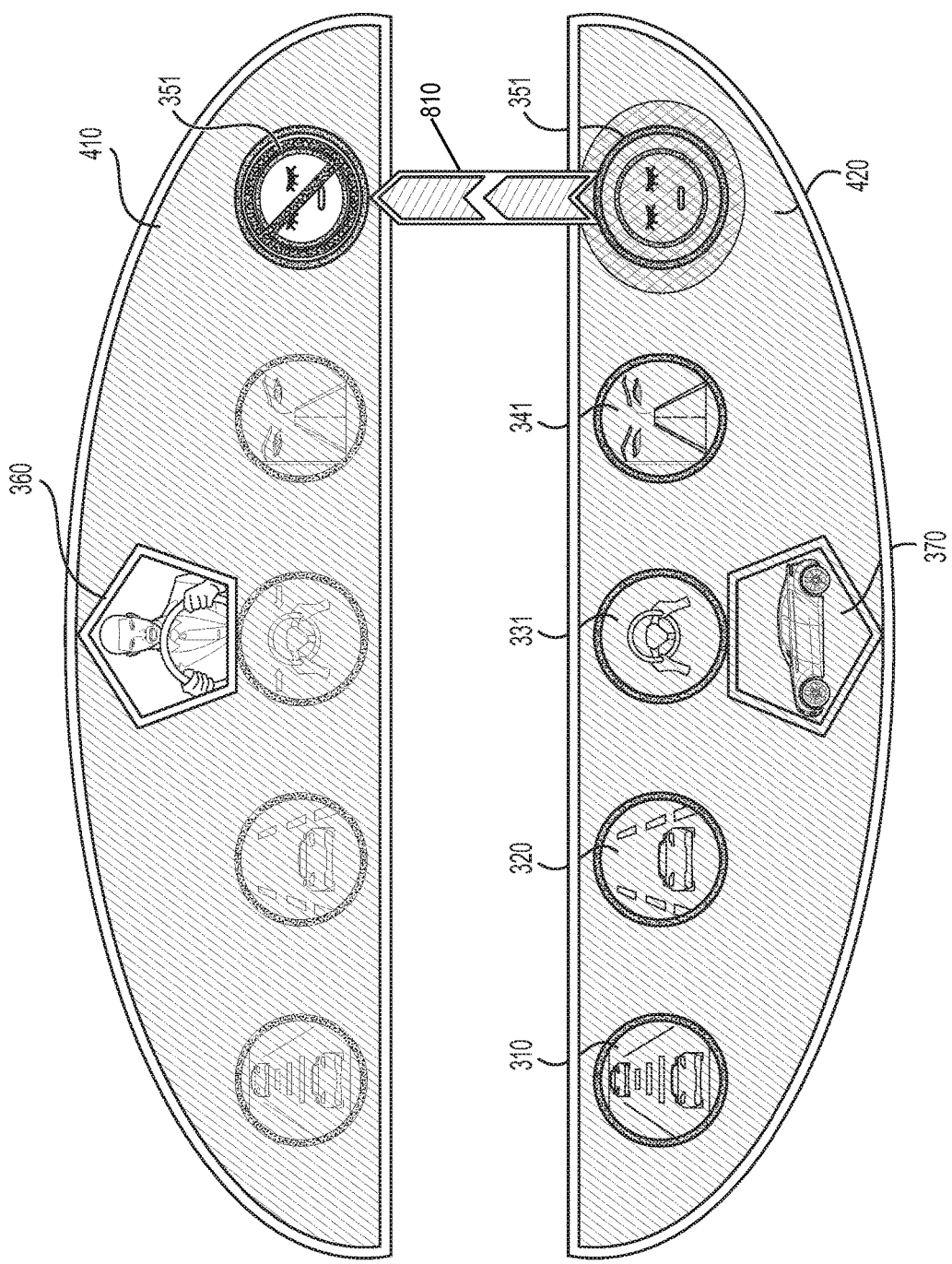
FIG. 8 shows an example DVR matrix corresponding to a Level 4 automation level with a notification indicating a driving responsibility transition request.

FIG. 8 shows the example DVR matrix corresponding to the Level 4 automation level with a notification indicating a driving responsibility transition request. The example DVR matrix of FIG. 8 corresponds to the responsibility transition situation described in S300 of the process 200 in FIG. 2. Specifically in FIG. 8 example, the ADS 110 requests for a transition from Level 4 automation level to Level 3 automation level. In other words, the responsibility transition requires a driver to wake up from a sleeping state. The example DVR matrix in FIG. 8 is similar to what is shown in the FIG. 4 example, however, a mark 810 representing the notification is displayed. Specifically, in an example, the mark 810 has a form of an arrow, and starts from a first graphic 351 in the vehicle row 420 pointing to a second graphic 351 in the driver row 410. In addition, in an example, the graphic 351 in the vehicle row 420 becomes gray indicating the related driving function will soon be removed from the vehicle row 420.

Figure 9:
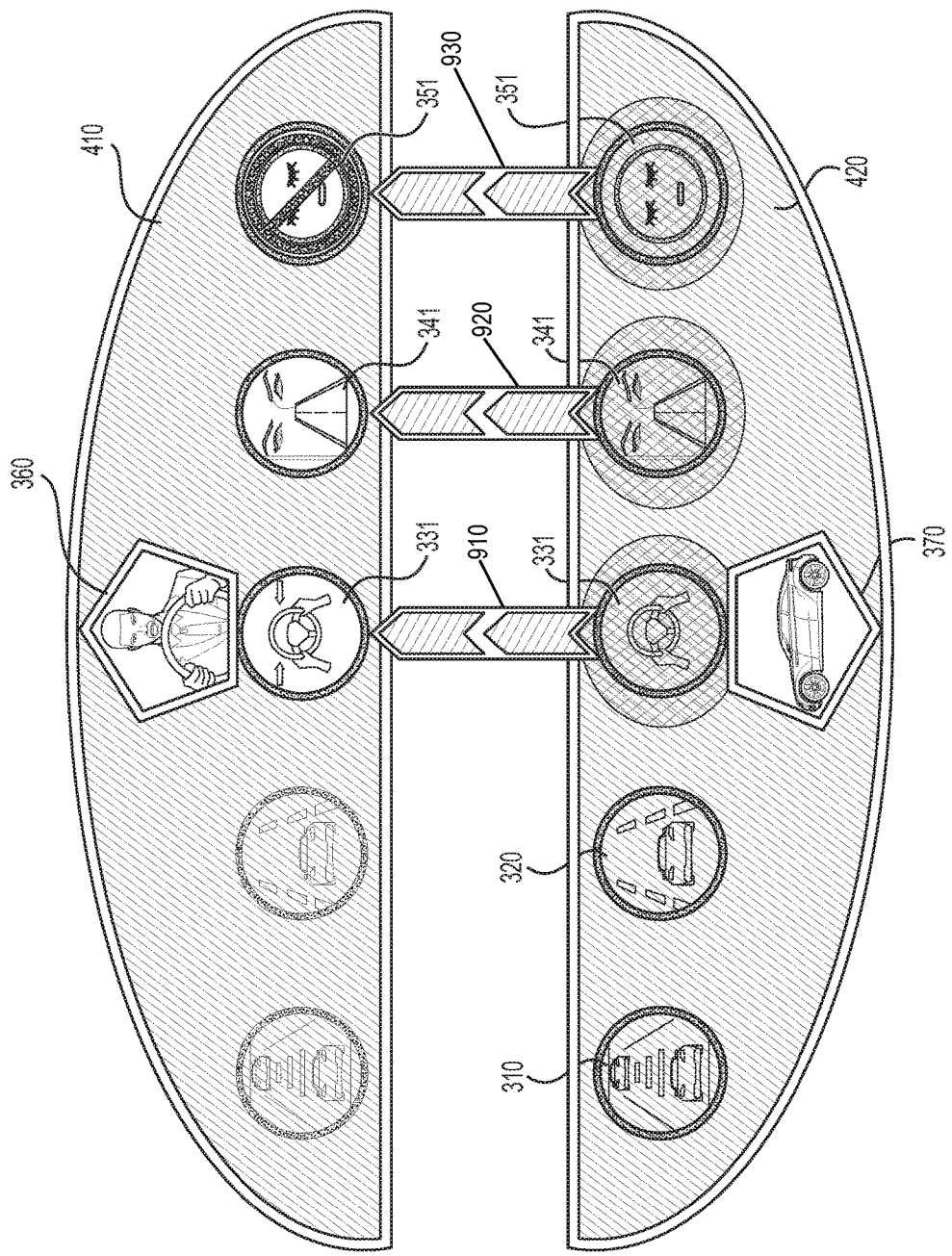
FIG. 9 shows another example DVR matrix corresponding to the Level 4 automation level with a notification indicating a driving responsibility transition request.

FIG. 9 shows another example DVR matrix corresponding to the Level 4 automation level with a notification indicating a driving responsibility transition request. The example DVR matrix of FIG. 8 corresponds to a situation that the ADS 110 requests for a transition from Level 4 automation level to Level 2 automation level. This corresponds to the responsibility transition situation described in S300 of the process 200 in FIG. 2. At the example DVR matrix, three marks 910-930 representing the notifications are displayed. Specifically, each mark 910-930 has a form of an arrow, and starts from a first graphic 331, 341, or 351 in the vehicle row 420 pointing to a second graphic 351, 341, or 351 in the driver row 410. In addition, in an example, the graphics 331, 341, and 351 in the vehicle row 420 become gray indicating the related driving functions will soon be removed from the vehicle row 420.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An automated driving system in a vehicle, comprising:
a display device that displays information to a driver of the vehicle; and
a controller configured to
determine an automation state of the automated driving system,
control the automated driving system in accordance with the automation state, and
display, at the display device, a driver and vehicle responsibility matrix (DVR matrix) based on the determined automation state, the DVR matrix including:
a first set of indicators displayed in a first row each indicating a different driving responsibility of the driver and a second set of indicators displayed in a second row each indicating a different driving responsibility of the automated driving system, and
three or more columns each including a first indicator of the first set of indicators in the first row and a second indicator of the second set of indicators in the second row,
wherein the first indicator and the second indicator in a same column correspond to a same driving responsibility, a first column of the three or more columns indicates whether the driver should assume longitudinal control of the vehicle, a second column of the three or more columns indicates whether the diver should assume lateral control of the vehicle, and a third column of the three or more columns indicates whether the driver should assume eyes-on road responsibility.

2. The automated driving system of claim 1, wherein
the DVR matrix is displayed as a graphic, and
the first set of indicators and the second set of indicators are icons and/or texts.

3. The automated driving system of claim 1, wherein
the controller is further configured to display a notification indicating a request of the automated driving system for driving responsibility transition between the driver and the automated driving system, and
the notification is represented with an indicator between two indicators in a same column of the DVR matrix.

4. The automated driving system of claim 1, wherein the controller is further configured to display an indicator of the first row or the second row with a color or a flash to indicate a warning condition.

5. The automated driving system of claim 1, wherein the display device is one of a head up display, an instrument cluster, a liquid crystal display, and a mobile device.

6. The automated driving system of claim 1, wherein the responsibility of the driver further includes performing one of hand-on-wheel, eyes-on-warnable display, seat recline, seat turn around, and no-sleeping.

7. The automated driving system of claim 1, wherein control the automated driving system in accordance with the automation state includes actuate an actuator in an operational system of the vehicle.

8. The automated driving system of claim 1, further comprising at least one of a steering system, a braking system, and a throttling system.

9. The automated driving system of claim 1, wherein the first indicator indicates a particular responsibility of the driver and the second indicator indicates a responsibility of the automated driving system that is a reciprocal responsibility to the particular responsibility.

10. A method for an automated driving system in a vehicle, the method comprising:
receiving information indicating a road condition;
determining, based on the road condition, an automation state of the automated driving system;
controlling the automated driving system in accordance with the automation state; and
displaying a driver and vehicle responsibility matrix (DVR matrix) based on the determined automation state, the DVR matrix including:
a first set of indicators displayed in a first row each indicating a different driving responsibility of a driver of the vehicle and a second set of indicators displayed in a second row each indicating a different driving responsibility of the automated driving system, and
three or more columns each including a first indicator of the first set of indicators in the first row and a second indicator of the second set of indicators in the second row,
wherein the first indicator and the second indicator in a same column correspond to a same driving responsibility, a first column of the three or more columns indicates whether the driver should assume longitudinal control of the vehicle, a second column of the three or more columns indicates whether the diver should assume lateral control of the vehicle, and a third column of the three or more columns indicates whether the driver should assume eyes-on road responsibility.

11. The method of claim 10, wherein the step of displaying a DVR matrix includes:
displaying the DVR matrix as a graphic, wherein the indicators are displayed as icons and/or texts.

12. The method of claim 10, further comprising:
displaying a notification indicating a request of the automated driving system for driving responsibility transition between the driver and the automated driving system, the notification being represented with an indicator between two indicators in a same column of the DVR matrix.

13. The method of claim 10, further comprising:
displaying an indicator of the first row or the second row with a color or a flash to indicate a warning condition.

14. The method of claim 10, wherein the step of displaying a DVR matrix includes:
displaying the DVR matrix at a display device that is one of a head up display, an instrument cluster, a liquid crystal display, and a mobile device.

15. The method of claim 10, wherein the responsibility of the driver further includes performing one of hand-on-wheel, eyes-on-warnable display, seat recline, seat turn around, and no-sleeping.

16. A non-transitory computer-readable storage medium on which computer readable instructions of a program are stored, the instructions, when executed by one or more processors, causing the one or more processors to perform a method for an automated driving system in a vehicle, the method comprising:
receiving information indicating a road condition;
determining, based on the road condition, an automation state of the automated driving system;
controlling the automated driving system in accordance with the automation state; and
displaying a driver and vehicle responsibility matrix (DVR matrix) based on the determined automation state, the DVR matrix including:
a first set of indicators displayed in a first row each indicating a different driving responsibility of a driver of the vehicle and a second set of indicators displayed in a second row each indicating a different driving responsibility of the automated driving system, and
three or more columns each including a first indicator of the first set of indicators in the first row and a second indicator of the second set of indicators in the second row,
wherein the first indicator and the second indicator in a same column correspond to a same driving responsibility, a first column of the three or more columns indicates whether the driver should assume longitudinal control of the vehicle, a second column of the three or more columns indicates whether the diver should assume lateral control of the vehicle, and a third column of the three or more columns indicates whether the driver should assume eyes-on road responsibility.

17. The non-transitory computer-readable storage medium of claim 16, wherein the step of displaying a DVR matrix includes:
displaying the DVR matrix as a graphic, wherein the indicators are displayed as icons and/or texts.

18. The non-transitory computer-readable storage medium of claim 16, wherein the method further comprises:
displaying a notification indicating a request of the automated driving system for driving responsibility transition between the driver and the automated driving system, the notification being represented with an indicator between two indicators in a same column of the DVR matrix.

19. The non-transitory computer-readable storage medium of claim 16, wherein the method further comprising:
displaying an indicator of the first row or the second row with a color or a flash to indicate a warning condition.

20. The non-transitory computer-readable storage medium of claim 16, wherein the responsibility of the driver further includes performing one of hand-on-wheel, eyes-on-warnable display, seat recline, seat turn around, and no-sleeping.

* * * * *